Jan. 4, 1949.  W. R. AMSTUTZ  2,458,129
LETTER SCALE AND THE LIKE
Filed Jan. 13, 1947
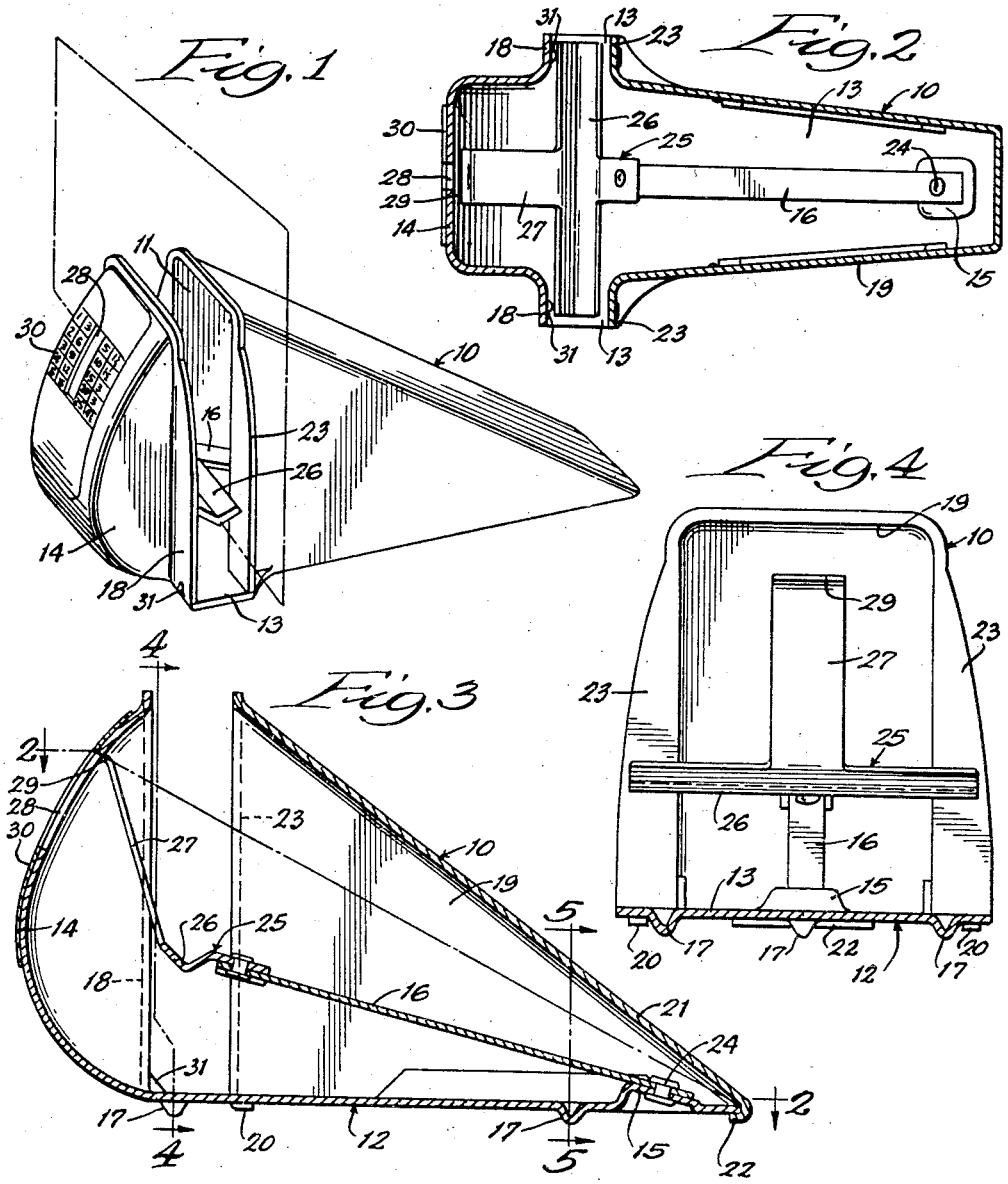
Inventor:
Walter R. Amstutz,
By Dawson, Brother & Spangenberg,
Attorneys.

Patented Jan. 4, 1949

2,458,129

UNITED STATES PATENT OFFICE 2,458,129

LETTER SCALE AND THE LIKE

Walter R. Amstutz, Forest Park, Ill., assignor to Metal Specialties Manufacturing Co., Chicago, Ill., a corporation of Illinois Application January 13, 1947, Serial No. 721,813

4 Claims. (Cl. 265—68)

This invention relates to a letter scale and the like. It is particularly useful in the indication of the weight, postage required, and other data in connection with letters and other material to be mailed.

An object of the invention is to provide a scale or weighing instrument of extremely simple and effective design for facilitating the weighing of letters, etc., while at the same time protecting from contact with objects, etc., the operative weighing parts. Yet another object is to provide a structure of unique design providing for the supporting of letters, etc., on edge and upon a weighing instrument for the immediate visual indication of weight, postage required, etc. A still further object is to provide a casing structure provided with a vertical slot adapted to receive a letter and the like, the slot providing guiding mechanism for the accurate alignment of the letter upon a weighing device and for the recording of the weight, etc. Other specific objects and advantages will appear as the specification proceeds.

The invention is illustrated, in a preferred embodiment, by the accompanying drawing, in which—

Figure 1 is a perspective view of apparatus embodying my invention; Fig. 2, a plan sectional view, the section being taken as indicated at line 2—2 of Fig. 3; Fig. 3, a vertical sectional view of the structure shown in Fig. 1; Fig. 4, a transverse sectional view, the section being taken as indicated at line 4—4 of Fig. 3; and Fig. 5, a transverse sectional view, the section being taken as indicated at line 5—5 of Fig. 3.

In the illustration given, 10 designates a casing which provides near the forward end thereof a vertical transverse slot 11.

The casing 10 may be formed in any desired shape and of any suitable material. In the specific illustration given, the casing 10 is formed in two main parts. One part 12 provides a bottom plate 13 and a front casing structure 14. The bottom plate 13 is provided near its rear with an upwardly-struck portion providing a platform 15 upon which the spring member 16 is mounted. The bottom plate 13 may be provided with three or more downwardly-struck bosses 17 providing legs for the structure.

The forward casing structure 14 provides a housing of the type illustrated and provides laterally-extending flanges 18 at the forward side of the slot 11.

The casing 10 comprises not only the integral structure 14 which has just been described, but also a rear casing structure 19 which is channeled in cross section with its lower open side closed by the bottom plate 13. Lugs 20 carried by the casing 19 extend through and are clamped under the bottom plate 13 so as to confine the casing 19 upon the bottom plate 13. Also, the inclined wall 21 of casing 19 extends downwardly and is clamped under the bottom plate at 22. The casing 19 is provided with laterally-extending flanges 23 parallel with the flanges 18 of casing 14.

The spring 16, which is secured upon platform 15 by rivet 24, extends forward and is riveted at its forward end to a letter holder 25. The letter holder 25 may be formed in any suitable way and of any suitable material. In the illustration given, it comprises a metal strip having a trough-like support 26 substantially filling the vertical slot 11 and extending laterally also between the flanges 18 and 23. The member 25 is also provided with a forwardly-extending indicator arm 27 which serves the double function of directing letters downwardly and into the channel of the member 26 and also as an indicator of the weight to be registered.

The front housing wall 14 is provided with a slot 28 through which the forward edge 29 of the indicator arm 27 is visible. The housing 14 also carries at its forward side a scale or indicia-bearing strip 30. The strip 30 may consist of a plate or sheet fixed to the forward part of the housing 14 and bearing indicia as indicating weight and also the appropriate postage, air mail cost, special mail rates, etc., the data as to such costs being aligned with each ounce indicated or other unit of weight measurement employed.

The flange 18 may be strengthened near its forward lower corner by indenting the same at 31.

The spring 16 may be formed of any suitable material. I prefer to form it of metal and to grind the spring so as to give it the desired degree of resilience. In the assembly of the structure, the spring and letter-receiving member 25 carried thereby are secured in position and a test is made to determine the proper weighing value of the spring 16. The scale 30 is then placed in position so that its indicia are in proper alignment with the weighing value of the spring 16 as determined by the test. Since the housing 14 provides a relatively wide front surface, the scale may be moved slightly higher or slightly lower to accommodate itself to the weighing value of the spring as thus determined and, in this manner, a rapid assembly of the parts can be produced with an efficient correlation between the scale and spring.

*Operation*

In the operation of the device, a letter is dropped into the slot 11. As the letter falls, it strikes the inclined indicator arm 27 and is guided into the trough-like or channeled member 26 of the letter holder 25. The letter holder 25 thus carries the letter on edge and reflects the weight upon the supporting spring 16. Indicator arm 27 moves downwardly as the spring 16 yields and the forward indicating edge 29 is brought into alignment with the weight indicia on the front of the scale 30. For example, the column on the extreme left of the scale may show the weight in ounces; the next column may indicate the postage for first-class mail; the next column on the right of slot 28 may show postage for air mail; and the extreme column to the right may show the postage for third-class mail. It will be understood that these various columns may contain any desired indicia with respect to the weight, postage, etc., desired. After weighing, the letter may be swung to the right or to the left toward a pile of mail, the slot 11 permitting such removal in either direction.

The relative narrowness of the slot 11, while providing a means for maintaining the letter on end, prevents any of the weight of the letter from being sustained by the walls of the casing since the letter will be thus maintained in almost vertical position. Since the letter holder 25 entirely supports the letter, both hands of the operator are free and may be used during the weighing operation in the removal of letters, grasping a new letter to be weighed, etc. It is found that the spring 16, which is ground to a desired thinness, is highly efficient in giving the exact weight of the letters through the range desired while at the same time remaining efficient through long years of use. No adjustment is necessary after the original assembly and after the accurate placing of the scale 30 in alignment with the indicator arm of spring 16. The product is extremely small and compact, taking up but a fraction of the space required by weighing devices heretofore employed.

The forward face of housing 14 is preferably arcuate so that the indicator arm 27 as it moves downwardly will remain closely adjacent the scale 30. With this structure, the operative parts, including the spring, the letter support, the indicator arm, etc., are all housed securely within the casing. Even the wide channeled member 26 is protected throughout, and particularly at its ends, by the casing and by the projecting flanges 18 and 23. Thus, even though books, papers, and various objects that are usually thrown upon desks, etc., should strike the device, no harm will be caused to the delicate weighing structure within the casing, and the narrow vertical slot 11 will permit only the insertion of the documents to be weighed and in edgewise position.

While in the foregoing specification, I have set forth certain details of the structure at length for the purpose of illustrating a single embodiment of the invention, it will be understood that such embodiment may be varied widely by those skilled in the art without departing from the spirit of my invention.

I claim:

1. In a letter scale device, a hollow casing having a forwardly-curved face provided with a vertical slot, a scale sheet secured to said arcuate face and having a slot registering with the slot of said casing, said casing providing also a transverse slot open at its top and adjacent the front of said casing, a spring having its rear end anchored to said casing and a forward free end adjacent said transverse slot, said spring being adapted to receive letters placed into said vertical slot, and an indicator arm associated with said spring and extending forwardly into alignment with said slot in the front wall of said casing.

2. In a letter scale device, a hollow casing provided with a vertical slot open at its top at the forward end of the casing, a spring having one end anchored to said casing and its other end extending to a point adjacent said slot, a letter support secured to the end of said spring and having a channeled member extending laterally of said slot and in alignment therewith, an indicator arm carried by said support, and an indicia-bearing member supported by said casing in visible relation to the end of said indicator arm.

3. In a letter scale device, a hollow casing provided at its forward end with a vertical slot and with laterally-extending flanges on either side of said slot, a spring anchored at its rear end to one end of said casing, a letter support fixed to the end of the spring, said letter support extending laterally within said slot and within the space between said flanges, an indicator arm carried by said spring, and an indicia-bearing member carried by said casing in visual alignment with the end of said indicator arm.

4. In a letter scale device, an elongated hollow casing provided with a vertical slot open at its top and extending transversely of the forward end of the casing, a spring having one end anchored to the rear portion of said casing and its other end extending to a point adjacent said slot, a letter support secured to the forward portion of said spring and having a laterally-extending channeled member in alignment with said slot, an indicator arm supported by said spring, and a member bearing spaced markings thereon supported by said casing in visible relation to said indicator arm.

WALTER R. AMSTUTZ.

REFERENCES CITED

The following references are of record in the file of this patent:

UNITED STATES PATENTS

| Number | Name | Date |
|---|---|---|
| 739,047 | Wilson | Sept. 15, 1903 |
| 2,009,363 | Scheurer | July 23, 1935 |
| 2,036,635 | Kingsbury | Apr. 7, 1936 |
| 2,036,636 | Kingsbury | Apr. 7, 1936 |
| 2,036,637 | Kingsbury | Apr. 7, 1936 |